April 5, 1949.
A. L. BURWELL
2,466,001
METHOD OF MAKING CELLULAR PRODUCTS
FROM VOLCANIC ASH
Filed April 23, 1947
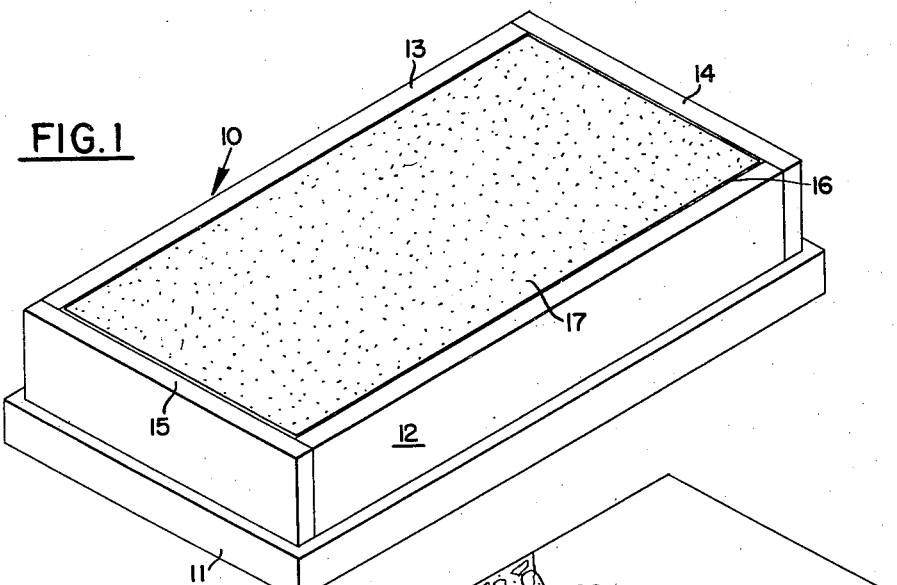
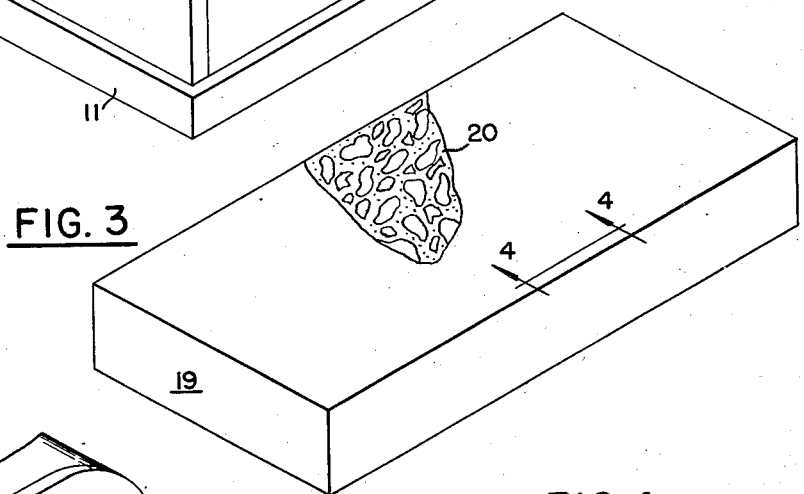
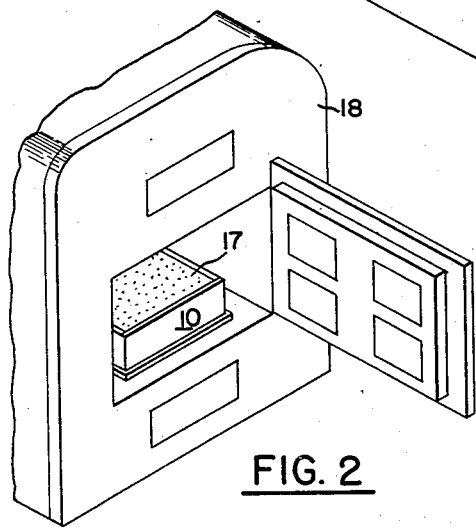
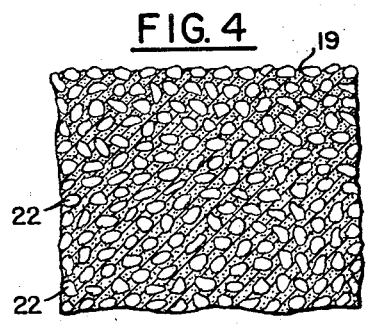
INVENTOR
ALBERT L. BURWELL
BY
*Toulmin & Toulmin*
ATTORNEY Patented Apr. 5, 1949

2,466,001

UNITED STATES PATENT OFFICE 2,466,001

METHOD OF MAKING CELLULAR PRODUCTS FROM VOLCANIC ASH

Albert L. Burwell, Norman, Okla., assignor to University of Oklahoma Research Institute, Norman, Okla., a corporation of Oklahoma Application April 23, 1947, Serial No. 743,442

1 Claim. (Cl. 49—77)

This invention deals with a method of producing cellular products and articles from inorganic materials, in particular glassy materials of volcanic origin such as the so-called volcanic ashes, volcanic dust, pumice, tuff, and with the products obtained thereby.

It is an object of this invention to make cellular products and articles from unconsolidated or comminuted materials.

It is an object of this invention to make cellular products and articles from unconsolidated or comminuted volcanic materials without the use of any binder material.

It is another object of this invention to make cellular products and articles without the use of any additional substances, such as gasifying materials.

It is another object of this invention to make cellular products and articles which do not allow the passage of gases or liquids therethrough.

It is another object of this invention to make cellular products and articles which have heat and sound insulating properties.

It is still another object of this invention to make cellular products and articles which have a high degree of strength which makes them usable as construction material.

It is still another object of this invention to make cellular products and articles which have an extremely light weight and yet a considerable degree of strength.

It is still another object of this invention to make cellular products and articles which are relatively inert with regard to acids, alkalies and other corrosive factors.

It is still another object of this invention to make cellular products and articles which have a high degree of heat-resistance.

It is still another object of this invention to make cellular products and articles which are extremely inexpensive, the raw materials having been considered practically valueless heretofore and the method and the apparatus for their production being of great simplicity.

These and other objects are accomplished by heating unconsolidated or comminuted inorganic material of volcanic origin, in a manner and at temperatures whereby the material is first dehydrated, then sintered, followed by vitrification and consolidation, which condition, by further increase in temperature, becomes pyroplastic and highly viscose with simultaneous development of gas; this gas, however, cannot escape due to the high viscosity of the vitreous mass and so causes expansion of the mass. On cooling this mass, a cellular product is thus obtained.

In carrying out the method of my invention, the loose volcanic material, such as volcanic ash as it is found, for instance, in various locations in this country, has a particle size so that all will pass a 40-mesh sieve and a considerable portion thereof will be 40 microns and smaller. The material is preferably first air-dried and then passed through a 40-mesh sieve to remove extraneous matter. These preparatory steps, however, are optional. If the volcanic material is consolidated, such as volcanic tuff, it is pulverized to pass a 40-mesh sieve or finer. All these materials are to be comprised in this specification and in the claims by the term "unconsolidated volcanic ash." The powder is then ready for the bloating step. This is carried out by heating the material to from 1000° to 1100° C., preferably to substantially 1100° C., whereby the material sinters and shrinks to a vitreous product ordinarily reddish in color. This heating is preferably carried out slowly and gradually; I have found that best results are obtained by using 4 hours to attain the temperature desired and by then maintaining that temperature for 2 hours. Thereafter, the bloating proper is carried out by increasing the temperature rapidly to from 1175° to 1450° C., preferably, though, to 1250° to 1350° C. As shown in Figures 1 and 3, the mass is permitted to rise during bloating unrestrictively. After the bloating period of temperature rise, from 1175° C. to 1450° C., the mass is held at this temperature for from 15 minutes to 1 hour. At these temperatures the vitrified mass is plastic and gas develops, but the viscosity is still high enough as to prevent escape of the gas. Thus, the gas is trapped in the plastic mass, and it produces a cellular structure which persists on cooling. The holding time following this bloating period ranges from 15 to 60 minutes. I have found that the size of the cells and the thickness of the cell walls are usually increased by the longer period of heating. The product obtained after bloating is grey to drab in color. It is advantageous, though not obligatory, to carry out the heating in a neutral atmosphere. It is also advisable in some cases to anneal the product in order to decrease sensitivity to shock and increase its strength, but this treatment is optional.

In carrying out the bloating proper, which consists of heating at the higher temperature, one has to see to it that the temperature is such that a certain degree of fluidity of the substance is produced but with its viscosity still high enough as to prevent escape of the gas developed during the heating. It is well to emphasize that the product obtained is not porous, that means, that it does not have communicating cavities or channels which would allow the penetration of fluids or gases through the material. Rather, the material is strictly cellular, having discrete voids which makes the product valuable as a sound and heat insulating material.

The size of the cells and the thickness of the cell walls of the final product are dependent upon the extent of the bloating, in particular on the time and the temperature of heating. The times and temperatures which have been given in the above description of the process relate to a material (volcanic ash) with particle size ranging from through 40-mesh sieve to extreme fineness, as volcanic ash is normally found to occur in nature. Products produced by bloating at the lower temperatures in the bloating range have higher bulk density and smaller cells, due to the higher viscosity of the mass and the smaller amount of gas produced. Conversely, the higher the temperature used within the bloating range the lower the bulk density, due to the lowered viscosity and greater amount of gas developed. Also, at the higher temperatures within the bloating range the gas is developed rapidly whereby full expansion of which the material is capable is attained quickly so that further extension of the heating time tends only to change the cell size and wall thickness without materially affecting the volume of the mass.

I have also found that, other factors being the same, the viscosity of the pyroplastic mass is higher the lower the calcium oxide and magnesium oxide contents and also is higher the higher the silica content of the raw material.

The apparatus used for the production of my product is most simple and inexpensive. The accompanying drawings show one embodiment of an apparatus which was used with satisfaction for carrying out the process of this invention. The apparatus shown is for batch or periodic processing but the processing might as well have been conducted in apparatus designed for continuous production.

Figure 1 is a perspective view of a mold filled with unconsolidated matter for the production of bricks or slabs according to the process of this invention;

Figure 2 is a perspective view of a furnace with a filled mold therein;

Figure 3 is a perspective view of the final product in slab form with a part thereof enlarged to show its surface structure; and Figure 4 is an enlarged cross-sectional view taken along line 4—4 of Figure 3.

Referring to the drawings in detail, and in particular to Figure 1, the reference numeral 10 generally designates a mold composed of a base part 11 and side parts 12, 13, 14 and 15. The parts of the mold are made of refractory materials, e. g., silicon carbide, so as to be resistant to the high temperatures used in the process. The inside of the assembled mold is coated with a "parting" material 16 to prevent adhesion of the final product to the mold. Materials suitable as such parting substances are powdered silica, and kaolin; they are preferably applied in the form of an aqueous suspension to which has been added a binding agent such as dextrine, starch, or glue. The "parting" material may be applied by means of a spray gun or a brush. In the case of the use of an aqueous suspension, the water is preferably removed by drying the mold prior to its use. The application of the parting material facilitates the removal of the finished brick or slab from the mold. Unconsolidated volcanic material 17 is then filled into the mold prepared as described above.

Figure 2 shows a furnace 18 into which the mold 10, with a volcanic material 17, has been inserted for the purpose of heating and bloating the material and thus to form a slab of cellular structure.

Figure 3 shows the finished product 19 with a portion broken out as at 20 and enlarged in order to show the structure. The gases formed during the bloating process do not escape from the inside of the slab 19 due to the high viscosity of the material.

Figure 4 illustrates a structure of material obtained in cross-section; a great number of discrete cells 22 are interspersed there in the vitrified material of the slab 19.

The material for "parting" or lubricating the mold may be any material resistant to the high temperature used and which remains relatively unaltered by contact with the material of which the mold is constructed and by contact with the raw material and the final product under the high temperatures used. Kaolin and silica were found to be satisfactory for the purpose, particularly when mixed with water containing dextrine as a binding agent, so that it could be easily applied by brush or spray.

I have not been able to determine which factors are responsible for the gas development nor have I been able to analyze the gas developed.

While volcanic ash, in loose powdered form as found in Oklahoma, Texas, Kansas, and Nebraska, has been used with success for the process of my invention, other volcanic substances or materials of similar composition will be applicable as well, if unconsolidated or reducible to small particle size. It might be necessary though, to modify the heating time and temperatures for such other materials.

It will be understood that other materials than silicon carbide may be used for the molds as long as they are resistant to the high temperatures and will retain their shape.

It will be seen that the products obtained by the process of this invention are extremely cheap due to the simplicity of the process and the apparatus necessary, and due to the inexpensiveness of the raw material. The products obtained have a high degree of heat and sound insulation and also a high strength in spite of their light weight, all these properties making the products of the invention valuable for use as construction material for buildings, refrigeration equipment and furnaces.

It will also be understood that while there have been described herein certain specific embodiments of the invention it is not intended thereby to have it limited to or circumscribed by the specific details given in view of the fact that this invention is susceptible to various modifications and changes which come within the spirit of this disclosure and the scope of the appended claim.

I claim:

A method of making cellular materials from unconsolidated volcanic ash comprising the steps of (a) removing extraneous matter by passing said ash through a 40-mesh screen; (b) gradually heating said ash to reach a temperature of substantially 1100° C. within four hours and holding said temperature for approximately two hours;

(c) rapidly increasing the temperature from 1175° C. to 1450° C. until gas has developed and bloated the mass; (d) permitting the mass to bloat unrestrictively; (e) holding the last-mentioned temperature for a period of from fifteen minutes to one hour; and (f) cooling the product obtained.

ALBERT L. BURWELL.

REFERENCES CITED

The following references are of record in the file of this patent:

UNITED STATES PATENTS

| Number | Name | Date |
| --- | --- | --- |
| 1,840,609 | Slidell | Jan. 12, 1932 |
| 1,929,425 | Hermann | Oct. 10, 1933 |
| 2,251,130 | Haux | July 29, 1941 |
| 2,306,462 | Moorman | Dec. 29, 1942 |
| 2,377,076 | Ford | May 29, 1945 |

FOREIGN PATENTS

| Number | Country | Date |
| --- | --- | --- |
| 373,992 | Italy | Aug. 9, 1939 |
| 387,516 | Germany | Dec. 29, 1923 |